J. JOWITT.
Filters for Oils, Acids, &c.

No. 143,768. Patented Oct. 21, 1873.

Witnesses.
James P. McLean
Anne S. McLean

Inventor.
Josiah Jowitt

UNITED STATES PATENT OFFICE.

JOSIAH JOWITT, OF BROOKLYN, NEW YORK.

IMPROVEMENT IN FILTERS FOR OILS, ACIDS, &c.

Specification forming part of Letters Patent No. 143,768, dated October 21, 1873; application filed January 24, 1873.

*To all whom it may concern:*

Be it known that I, JOSIAH JOWITT, of the city of Brooklyn, in the county of Kings and State of New York, have invented a new and useful Improvement in the Construction of Filters for Filtering Acids and Other Liquids; and I hereby declare in what manner the same is to be constructed, arranged, and operated, reference being had to the accompanying drawings, which are lettered to correspond with and form a part of the specification.

Figure 1:
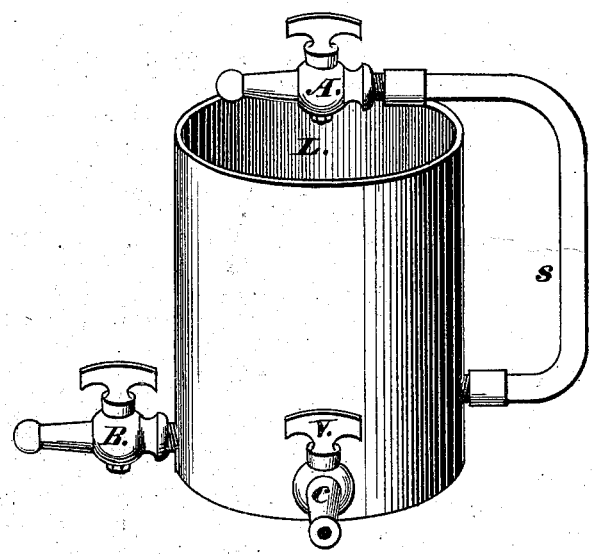
Figure 2:
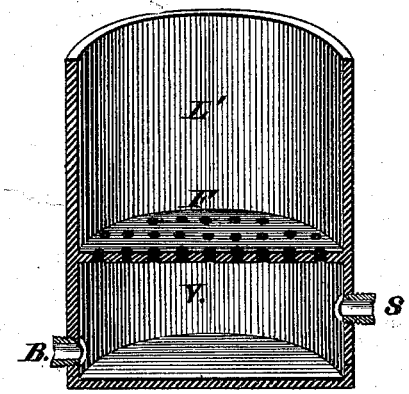

To enable those skilled in the mechanic arts to construct and operate the same, as well as the public to understand the nature thereof, I will describe it as follows, to wit:

Figure 1 is a perspective top and side elevation of a cylindrical filter, L, provided with a steam-pipe, S, with cock or valve A, blow-off valve or cock B, check valve or cock C, and perforated plate F. Fig. 2 is a vertical section of Fig. 1, showing the interior L', filtering-plate F, vacuum-chamber V, section of steam-pipe S, and blow-off cock B.

Having thus described the construction and arrangement of the several parts of my filter *in vacuo,* I will describe its operation as follows, to wit:

Place the bone-black in the upper chamber L, upon the perforated plate F, then empty the liquid to be filtered upon the said bone-black, open the cock or valve A to admit the steam from the generator or steam-chest to pass through the pipe S into the lower chamber V to blow out the atmospheric air through the escape-valve B with the escaping steam; then close the cocks A and B, and the liquid will flow through the bone-black and plate F into the vacuum-chamber V very rapidly; which may have to be checked to prevent the bone-dust from falling through the perforated plate by the increased weight of the liquid. This is effected by opening the check valve or cock C, to admit a small quantity of atmospheric air into chamber V, when required. The filtered liquid is drawn off through the blow-off pipe and cock B, which completes the operation of filtering liquids, oils, or acids by my improved vacuum-filter.

I am aware that steam-pumps are in common use for producing vacuum by suction in filtering apparatus; but the novelty of my invention consists in the arrangement of a steam-pipe, S, in combination with valves or cocks A, C, and B, the latter performing the double function of carrying off the steam with the confined air in the cleansed liquor-chamber V, and for drawing off the filtered liquid for use; therefore,

What I claim as new and useful, and wish to protect by Letters Patent of the United States, is—

The vacuum-chamber V, steam-pipe S, and escape-cock B, in combination with the check-cock C and cock A, all arranged and operating substantially in the manner and for the purpose set forth.

In testimony whereof I hereunto subscribe my name in the presence of two witnesses.

JOSIAH JOWITT.

Witnesses:
 JAMES P. MCLEAN,
 ANNE S. MCLEAN.